United States Patent [19]

Reinehr et al.

[11] 4,451,423

[45] May 29, 1984

[54] PROCESS FOR THE PRODUCTION OF FLAME RESISTANT MOULDED POLYMER ARTICLES

[75] Inventors: Ulrich Reinehr; Toni Herbertz; Günter Spilgies, all of Dormagen, Fed. Rep. of Germany

[73] Assignee: Bayer Aktiengesellschaft, Leverkusen, Fed. Rep. of Germany

[21] Appl. No.: 422,402

[22] Filed: Sep. 23, 1982

[30] Foreign Application Priority Data

Oct. 10, 1981 [DE] Fed. Rep. of Germany ....... 3140274

[51] Int. Cl.³ ............................. C08K 3/22; C08K 3/16
[52] U.S. Cl. .................................... 264/182; 524/409; 524/410; 524/412
[58] Field of Search ................ 264/182; 524/410, 412, 524/409; 106/18.28; 523/333

[56] References Cited

U.S. PATENT DOCUMENTS 2,427,997 9/1947 White ................................... 427/334
2,461,302 2/1949 Truhlar et al. ................... 427/255.3
3,154,509 10/1964 Van Gorder et al. ............. 524/410

FOREIGN PATENT DOCUMENTS 1373774 11/1974 United Kingdom .

OTHER PUBLICATIONS

Robert Little et al.: "Commercial Application of Flame-Resistant Finishes", Industrial and Engineering Chemistry, vol. 42, no. 3, pp. 432–440 (Mar. 1950).

*Primary Examiner*—Veronica P. Hoke
*Attorney, Agent, or Firm*—Sprung, Horn, Kramer & Woods

[57] ABSTRACT

Flame resistant moulded halogen-containing polymer articles which contain antimony oxide are advantageously obtained by adding a soluble antimony compound which gives rise to an antimony oxide to the solution of halogen-containing polymer in an organic solvent, producing the moulded polymer article from the polymer solution and converting the antimony compound to antimony oxide in this article before or during the after-treatment.

7 Claims, No Drawings

PROCESS FOR THE PRODUCTION OF FLAME RESISTANT MOULDED POLYMER ARTICLES

BACKGROUND OF THE INVENTION

This invention relates to a process for the production of flame resistant, self-extinguishing moulded polymer articles, in particular to a process for the production of flame resistant, self-extinguishing polyacrylonitrile filaments.

The production of polyacrylonitrile filaments which are slow to ignite and difficult to burn are gaining increasingly in importance. Flame resistant fibers produced from these filaments are required mainly for nightwear, carpets, curtains, car interiors and blankets. Acrylonitrile copolymers containing vinylidene chloride polymer units have a higher flame resistance than acrylonitrile homopolymers and copolymers which do not contain vinylidene chloride units. A further increase in the flame resistance may be obtained by the presence of antimony oxide the flame retarding action of which is due to a synergistic effect with halogen compounds.

The addition of antimony oxide does, however, lead to difficulties in the course of production of the fiber due to the large particle size of antimony oxide, which is generally from 2 to 7 $\mu$m. If, for example, a 35%, by weight, spinning solution of an acrylonitrile copolymer consisting of 59%, by weight, of acrylonitrile, 37.5%, by weight of vinylidene chloride and 3.5%, by weight, of sodium methallyl sulphonate in dimethyl formamide is dry spun from a 240 aperture die with the addition of 2%, by weight, of antimony trioxide, based on the polymer solids content, then the spinning operation is subject to numerous disturbances and the filaments break in the spinning shaft. Antimony is deposited in the spinning apparatus, in particular in the pipes, pumps and packing screens and especially in the spinning die. There has been no lack of attempts to overcome these difficulties. In British Pat. No. 1,373,774, for example, there is described the preparation of antimony oxide sols with particles having a maximum dimension of 50 nm for the preparation of flame resistant additives which do not give rise to spinning troubles and matting effects. Another process (German Offenlegungsschrift No. 2,509,846) proposes the addition of at least 0.1 part, by weight, of zinc to prevent the precipitation of metallic anitmony. In German Offenlegungsschrift No. 3,008,753 there is described the preparation of a suspension of antimony oxide, water and an organic solvent and the mixing of this suspension with the viscous spinning solution as a means for producing modacrylic fibers having high flame resistance and high gloss. Another method of preparing antimony trioxide having a small particle size of at the most 10 nm involves, according to German Offenlegungsschrift No. 2,913,276, stirring together antimony trioxide and a sulphonamide and precipitating the homogenized mass into a 50% by weight aqueous dimethyl formamide solution. Other processes for the preparation of very finely divided antimony oxide recommend combinations of antimony oxide with alkali metal or alkaline earth metal antimonates (German Offenlegungsschrift No. 2,054,304) or the heating of antimony oxide to temperatures of from 400° to 570° C. (U.S. Pat. No. 3,333,970). Water-insoluble antimony complexes of antimony trichloride, $\alpha$-hydroxycarboxylic acid and monoisocyanates are recommended in German Offenlegungsschrift No. 2,422,171. German Offenlegungsschrift No. 2,422,172 suggests the use of antimony esters obtained as reaction products of antimony trichloride with carboxylic acid esters as a flame proofing additive.

Common to all of the above-mentioned processes is the attempt to convert conventional antimony oxide into an antimony oxide having a smaller particle size by some means, but no truly satisfactory solution to the problem of preventing problems in the spinning process is achieved.

SUMMARY OF THE INVENTION

It was an object of the present invention to provide a process for the production of flame resistant moulded halogen-containing polymer articles which contain antimony oxide, in particular flame resistant acrylonitrile polymer filaments containing at least 40%, by weight, of acrylonitrile polymer units and at least 15%, by weight, of vinylidene chloride units, which process would substantially avoid difficulties in the production of the moulded articles, in particular interference with the spinning operation or the formation of deposits in the apparatus used for producing the moulded articles, in particular the spinning apparatus, and which would not require numerous manipulations or physical or chemical changes of the antimony oxide.

It has now surprisingly been found that antimony oxide in the form of particles smaller than 50 nm, preferably smaller than 20 nm, may be homogeneously incorporated in solid polymer articles, in particular in halogen-containing polyacrylonitrile filaments, if, to the solution of a polymer in an organic solvent, there is added an antimony compound which forms antimony oxide in this solvent, preferably an antimony halide, in particular antimony trichloride, and moulded polymer articles are produced from the polymer solution and the antimony compound is reacted to form antimony oxide in these articles before or during the after-treatment. In particular, the antimony compound is added to spinning solutions of a halogen-containing acrylonitrile polymer and an organic solvent, the spinning solution is spun and the spun filaments are brought into contact with water before or during the after-treatment. When such filaments are wetted, hydrolysis takes place instantaneously and is accompanied by the separation of very finely divided antimony oxide uniformly distributed over the whole cross-section of the filament. No spinning disturbances occur during the spinning process. The antimony compound may be added directly to the spinning solution of acrylonitrile polymers and spinning solvent or the antimony compound may first be dissolved in a portion of the spinning solvent, for example dimethyl formamide, and then added to the bulk of the spinning solution.

The quantity added to the solution of polymer solids is from 1 to 10%, by weight, preferably from 2 to 5%, by weight, based on the polymer solids.

Suitable spinning solvents, apart from dimethyl formamide, are also dimethyl acetamide, dimethyl sulphoxide and ethylene carbonate.

The antimony compounds used may be compounds of trivalent or pentavalent antimony or mixtures thereof, giving rise to antimony trioxide or anitmony pentoxide or mixtures of these oxides.

It is preferred to use compounds of trivalent antimony capable of being hydrolyzed to antimony trioxide.

DETAILED DESCRIPTION OF THE INVENTION

According to a further embodiment of the present invention, the hydrochloric acid formed as a result of hydrolysis of the antimony compound to antimony trioxide may be neutralized immediately after the contact with water, for example at the end of the spinning shaft, by the addition of substances which are alkaline in reaction, such as ammonia, amines or alkaline liquors, and removed from the production and spinning solvent recovery process. The process described above for the production of flame resistant polyacrylonitrile filaments may be applied equally to various synthetic polymers spun from a spinning solution by a dry or wet spinning process. Flame resistant shaped products and articles, such as films foils, and the like, may also be produced by the process according to the present invention.

The process according to the present invention achieves optimum homogenization and distribution of the fire retarding agent over the whole cross-section of the spun filament. According to electromicrographs the particle diameter of antimony trioxide is below 50 nm, preferably from 10 to 20 nm. To obtain electron-microscopic preparations, the fibers were dissolved in dimethyl formamide and the 0.5% by weight solution was drawn out to thin films which are transparent in the electron microscope. Owing to the small size of the particles, only a few particles may be seen under an optical microscope.

As test method for the flamability and fire characteristics of textile sheet products, the measurement according to the limiting oxygen index (LOI) was carried out. In this method, the proportion, by volume, of oxygen to the sum of oxygen and nitrogen is determined in that mixture in which the textile only just continues to burn from above downwards after ignition. The LOI is defined as follows:

$$LOI = \frac{O_2(\text{Vol. \%})}{O_2(\text{Vol. \%}) + N_2(\text{Vol. \%})} \times 100$$

Since the arrangement of the samples and the weight per unit area influence the results, only nonwoven webs weighing ca. 200 g/m² were tested by clamping them into a sample holder. The LOI value is a measure of the oxygen concentration required for combustion. The higher this concentration, the more difficult it is to ignite the filaments.

EXAMPLES

Example 1

720 g of antimony trichloride were dissolved in 64 kg of dimethyl formamide in a vessel for 30 minutes at room temperature with stirring. 36 kg of an acrylonitrile copolymer of 59%, by weight, of acrylonitrile, 37.5%, by weight, of vinylidene chloride and 3.5%, by weight, of sodium methally sulphonate were then added at room temperature with stirring. The mixture was then converted into a spinning solution by 2 hours heating at 70° C., filtered and dry spun from a 240 aperture die. No disturbances in the spinning operation occurred. The bundle of fibers obtained at the exit of the shaft was wetted with ammoniacal water over a dressing roller and wound up on reels. The spinning material, which had a total titer of 2,1600 dtex and an antimony trioxide content of 2.55%, by weight, based on the polymer solids content, was collected on spools and twisted into a cable having a total titer of 151,200 dtex. The cable was then washed in water at 80° C., stretched to 1:4 in boiling water, treated with antistatic dressing, dried, crimped and cut up into stable fibers 60 mm in length. The fibers, which had a final titer of 3.3 dtex, had a LOI value of 29.5 in the web and were completely self-extinguishing. The analytically determined antimony content of the fibers was 0.95% (calculated: 1.06%, by weight), the strength of the fibers was 2.4 cN/dtex and the fiber elongation was 40%.

Electromicrographs of the antimony trioxide particles formed in the fibers show that the particles measured less than 50 nm, in particular from 6 to 20 nm, with the most frequent particle size being approximately 10 nm.

The influence of the antimony trioxide content on the LOI value and hence the increase in flame resistance properties are illustrated in the following Table with reference to further examples. In all cases, an acrylonitrile copolymer having the chemical composition indicated in Example 1 was used, converted into a spinning solution as described in that Example and dry spun from a 240 aperture spinning die. The factor which was varied was the percentage content of antimony chloride in the spinning solution. The conditions under which hydrolysis and after-treatment took place correspond to those of Example 1. The LOI values were again determined in non-woven webs having an average weight of ca. 200 g/m², the antimony content of the fibers was determined analytically and the particle size of the antimony trioxide formed was determined by electromicrographs. The particle size distribution described in Example 1 was found to apply to the fibers in all cases.

TABLE

| No. | SbCl₃ content [%, by weight, based on PAN in spinning solution] | Sb₂O₃ content [%, by weight, based on PAN in spinning material] | Sb content [%, by weight, based on PAN] calculated | Sb content [%, by weight, based on PAN] observed | LOI value (% O₂) |
|---|---|---|---|---|---|
| 1 | none | none | 0 | 0.002 | 26 |
| 2 | 0.5 | 0.64 | 0.26 | 0.23 | 26.5 |
| 3 | 1.0 | 1.28 | 0.53 | 0.48 | 27 |
| 4 | 3.0 | 3.83 | 1.59 | 1.54 | 34.4 |
| 5 | 5.0 | 6.40 | 2.64 | 2.57 | 36.8 |

PAN = Polyacrylonitrile

Example 2 (Comparison)

720 g of antimony trioxide were suspended in 64 kg of dimethyl formamide and stirred for 30 minutes at room temperature. 36 kg of an acrylonitrile copolymer having the chemical composition indicated in Example 1 were then added with stirring and converted into a spinning solution by 2 hours heating to 70° C., filtered, and then dry spun to form filaments having a total titer of 2160 dtex as described in Example 1. After an initially smooth operation, the apertures of the die began to be occluded after ca. 10 minutes and the filaments broke in the spinning shaft. In spite of numerous manipulations, the filament bundle could not be deposited and collected on spools underneath the spinning shaft due to constant disturbances of the spinning process. The experiment had to be discontinued. According to photographs obtained from an optical microscope, the conventional commercially available antimony trioxide used had an average particle size of from 2 to 7 μm.

According to electromicrographs, the particle size was from 0.6 to 7 μm. The most frequent particle diameter was 4.5 μm.

We claim:

1. A process for the production of polyacrylonitrile filaments which contain antimony trioxide comprising adding antimony halide to a solution of a halogen-containing acrylonitrile polymer in an organic solvent, said antimony halide added in a quantity of from 1 to 10% by weight, based on the polymer content, spinning the solution to form filaments and contacting said filaments with water.

2. A process according to claim 1, wherein the antimony halide is added to the polymer solution in a quantity of from 2 to 5% by weight, based on the polymer content.

3. A process according to claim 1, wherein the antimony halide is added in the form of a solution in an organic solvent.

4. A process according to claim 3, wherein the solvent is dimethyl formamide.

5. A process according to claim 1, wherein substances which are alkaline in reaction are added to the water.

6. A process according to claim 1, wherein said acrylonitrile polymer contains at least 40% by weight, of acrylonitrile units and at least 15% by weight, of vinylidene chloride units.

7. A process according to claim 1, wherein said antimony halide is antimony trichloride.

* * * * *